Nov. 15, 1927.  
E. J. KANE  
1,649,596  
STEERING MECHANISM FOR LOCOMOTIVE CRANES  
Filed March 20, 1922  3 Sheets-Sheet 2
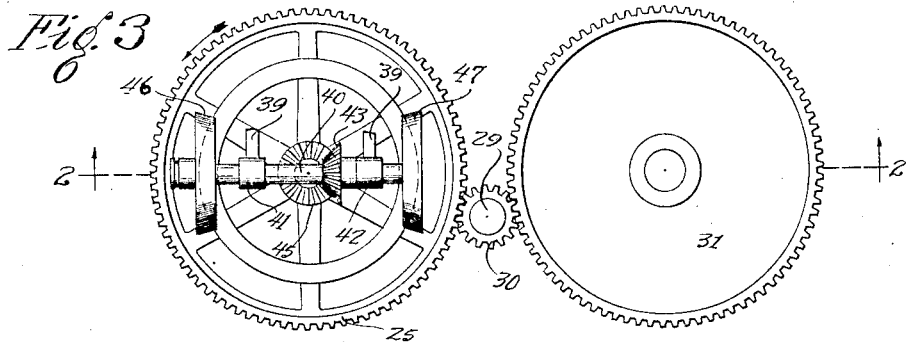
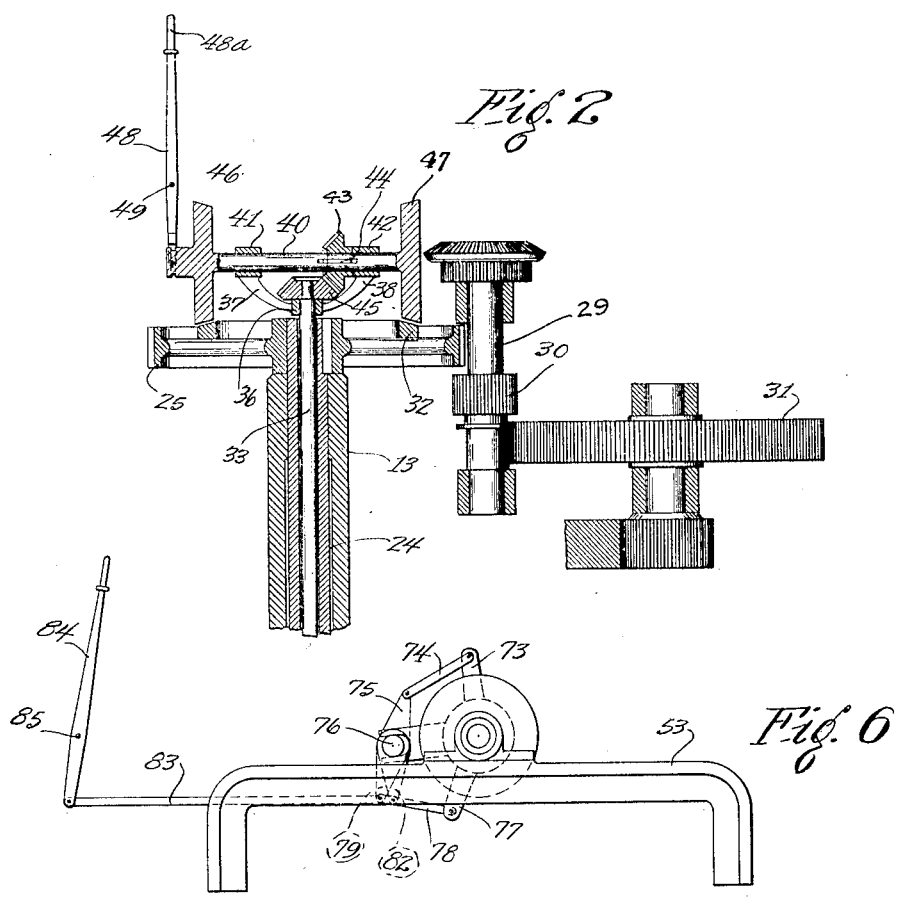
Witness  
J. L. Brown.
Inventor  
Edmund J. Kane  
By Sprinkle Hopkins McNair  
Attys.

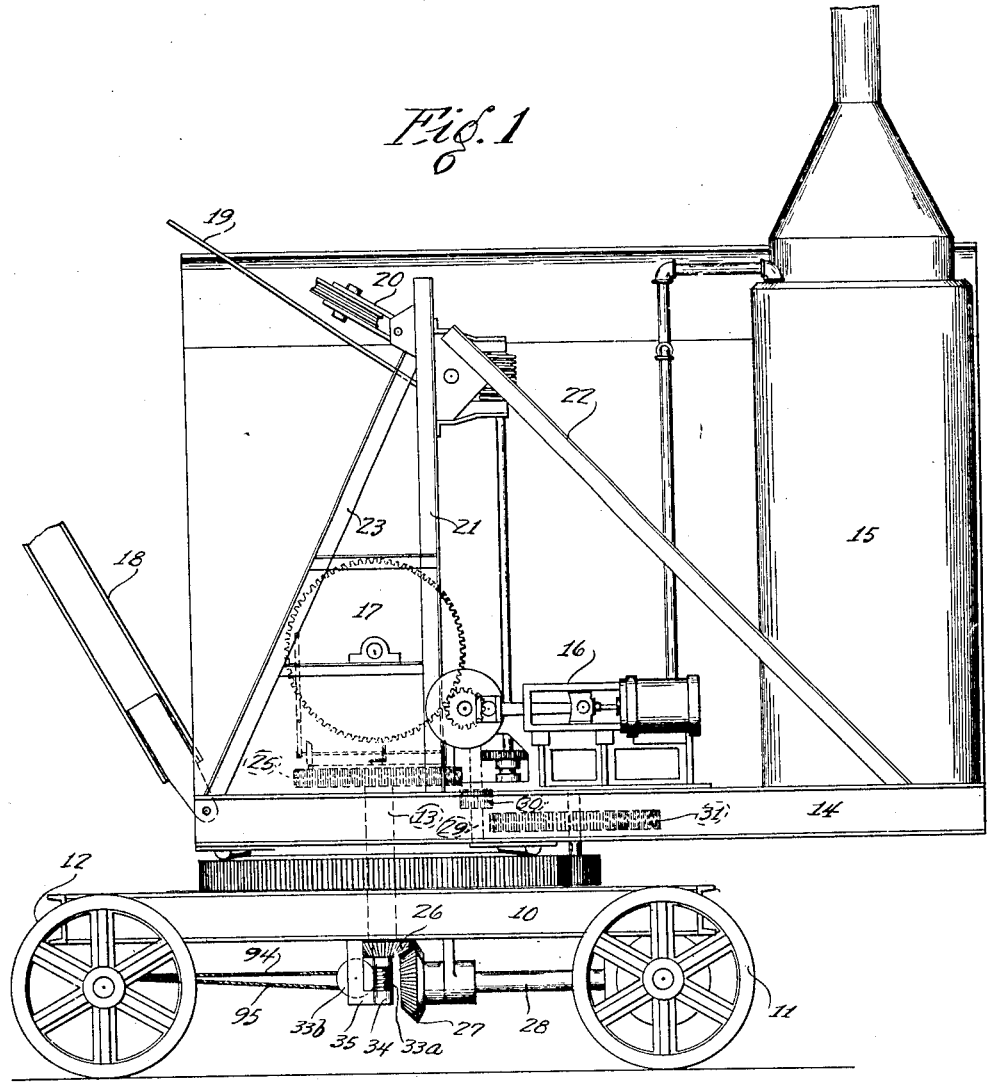

Nov. 15, 1927.  
E. J. KANE  
1,649,596  
STEERING MECHANISM FOR LOCOMOTIVE CRANES  
Filed March 20, 1922  3 Sheets-Sheet 3

Witness:—  
J. L. Brown.

Inventor:—  
Edmund J. Kane  
By Spencer Hopkins McClain  
Attys.

Patented Nov. 15, 1927.

1,649,596

UNITED STATES PATENT OFFICE.

EDMUND JOSEPH KANE, OF CHICAGO, ILLINOIS, ASSIGNOR, BY MESNE ASSIGNMENTS, TO MANITOWOC SHIP BUILDING CORPORATION, OF MANITOWOC, WISCONSIN, A CORPORATION OF WISCONSIN.

STEERING MECHANISM FOR LOCOMOTIVE CRANES.

Application filed March 20, 1922. Serial No. 545,319.

In the construction of such devices it is customary to pivotally mount a swinging or rotating bed or body upon a truck by means of a hollow pivotal member about the axis of which the swinging or rotating bed or body is adapted to have a swinging or rotating movement.

The power source with its accompanying mechanism for operating the device is mounted upon the swinging or rotating bed or body, and a hollow power transmitting shaft for transmitting power to the traction wheels of the truck is extended downwardly from the swinging or rotating bed or body through the hollow pivotal member. It has been proposed to extend the power transmitting shaft for operating the steering wheels of the truck from the swinging or rotating bed or body downwardly through the hollow traction power transmitting shaft, journalling the power transmitting shaft for the steering wheels in the traction power transmitting shaft. This construction has serious objections for the reason that the steering power transmitting shaft will have a tendency to jam with or stick to the traction power transmitting shaft owing to friciton caused by the rapid rotation of the respective shafts when in operation due to the exceedingly difficult problem of properly lubricating vertical bearings of such necessary length.

It is the primary object of the invention to extend the power transmitting shaft for the steering wheels through the power transmitting shaft for the traction wheels of a truck in such manner that the power transmitting shaft for the steering wheels of the truck will be supported in bearings independently of the power transmitting shaft for the traction wheels of the truck and the bearings so located as to be readily accessible for proper lubrication, thereby eliminating all friction between the power transmitting shaft for the steering wheels and the power transmitting shaft for the traction wheels of the truck.

Other objects of the invention will appear from the following description of the preferred form of the invention as depicted in the drawings and as more specifically defined in the appended claims.

In the said drawings, Fig. 1 is a side elevational view of a locomotive crane with my improved steering power transmitting means applied thereto.

Fig. 2 is a detail view partly in elevation and partly in section with parts omitted showing my improved steering power transmission means taken approximately on line 2—2 of Fig. 3.

Fig. 3 is a fragmental plan view of the steering mechanism of Figs. 1 and 2 showing portions of the supporting bracket broken away.

Fig. 6 is a side elevation view showing the detail of the clutch shifting mechanism for shifting the clutches shown in the modified form of the invention in Figs. 4 and 5.

Figure 5:
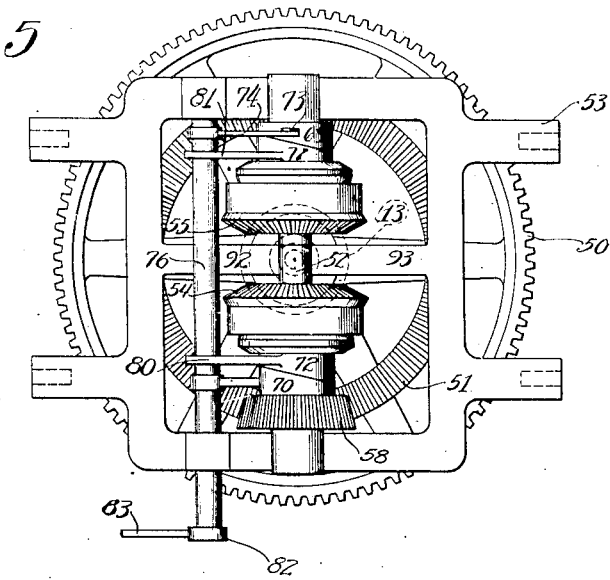
Fig. 5 is a top plan view of the modified form of the invention shown in Fig. 4 together with the supporting bracket.

In the embodiment of the invention as illustrated in the drawings the reference character 10 indicates the frame of a truck having traction wheels 11 and steering wheels 12. Rotatably mounted upon the truck 10 by means of hollow pivotal member 13 is a swinging or rotatable bed or body 14. A suitable power plant which may be in the form of a gas engine, electric dynamo or steam plant may be mounted on the swinging or rotating bed or body 14. In the drawings is shown the power plant as consisting of a steam boiler 15 and a steam engine 16. Winding drum 17, hoisting boom 18, cable 19, sheave 20 and support 21 together with suitable braces 22, 23 are provided and shown supported by the swinging or rotating bed or body 14 as is usual in such devices. The hollow power transmission shaft 24 for transmitting power to the traction wheels 11 of the truck has affixed to the upper end thereof travel gear 25. Bevel gear 26 affixed to the lower end of the power shaft 24 meshes with bevel gear 27 secured to the inner end of driving shaft 28 for imparting rotary movement to the traction wheels 11 to propel the truck in a forward or rearward direction, as is usual in automotive trucks. Main driving shaft 29 has slidably splined thereto connecting gear 30 which is adapted to be moved into mesh with travel gear 25 for propelling the truck or into mesh with rotating gear 31 for rotating the rotatable bed or body 14 about the axis of hollow pivotal member 13, as is usual.

All of the structure thus far described is old and forms no part of the invention and will therefore not be further described in detail.

Travel gear 25 has an annular bevel track 32 on the upper face thereof. Power transmitting shaft 33 for operating the steering wheels 12 of the truck passes downwardly through the hollow traction wheel power transmitting shaft 24 and is spaced from the inner walls thereof and journalled in and supported by bearing 34 at its lower extremity, said bearing being carried by bracket 35, on the truck frame, and shaft 33 is further journalled in and supported by bearing 36 carried by arms 37, 38 of bracket 39, which is suitably supported by the swinging or rotating bed or body 14, at its upper extremity. Shaft 33 is provided adjacent its lower extremity with a worm $33^a$ meshing with a worm gear (not shown) for rotating a drum $33^b$ having cables 94, 95 with their inner ends reversely wound therearound for operating the steering wheels of the truck in a well known manner. Shaft 40 journalled in bracket 39 as at 41, 42 has bevel gear 43 slidably splined thereto as at 44 and meshes with bevel gear 45 affixed to the upper extremity of the steering power transmitting shaft 33. Bevel friction gears 46, 47 are affixed to the outer ends of shaft 40 with the bottoms thereof lying in such a horizontal plane as will adapt them to be moved into engagement with the annular bevel track 32 of travel gear 25. Friction gears 46, 47 secured to shaft 40 are spaced apart a distance slightly greater than the diameter of the annular track 32 of travel gear 25, so that when the shifter fork lever 48 pivoted as at 49 is placed in neutral position as shown in Fig. 2, neither of the gears 46, 47 will be in engagement with the bevel track 32. Assuming however, that the travel gear 25 is rotated in an anti-clockwise direction, as indicated by the arrow in Fig. 3, and the handle $48^a$ of lever 48 be moved to the right from the position shown in Fig. 2, gear 47 will be moved into engagement with the bevel track 32 of travel gear 25 and will rotate the shaft 33 anti-clockwise also, and if the handle $48^a$ of lever 48 be moved back past the neutral position to the left of that shown in Fig. 2, bevel gear 46 will be moved into engagement with bevel track 32 of travel gear 25 and will impart the reverse clockwise movement of rotation to the steering power transmission shaft 33. The swinging body is provided with means, not shown, for locking against rotation thereof, while the truck is travelling.

Figure 4:
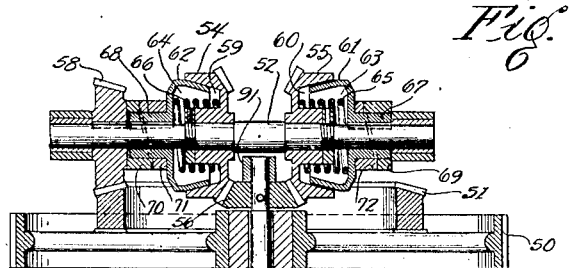
Fig. 4 is an elevational view partly in section showing a modified form of the invention.

In Figs. 4, 5 and 6 of the drawings is shown a modified form of the invention in which reference character 50 indicates the travel gear which has on its upper face annular bevelled rack 51. Shaft 52 journalled in bracket 53 has free bevel reversing gears 54, 55 mounted thereon and meshing with bevel gear 56 affixed to the upper extremity of the steering power transmission shaft 57. Bevel gear 58, affixed to shaft 52, meshes with bevelled rack 51 and imparts a rotary movement to shaft 57 when the truck is caused to travel by the rotation of travel gear 50 and either of the reversing gears 54, 55 is rotated with shaft 52 by their respective clutches. The free reversing gears 54, 55 have annular recesses 59, 60 respectively, in their outer faces to be frictionally engaged by cone shaped friction clutches 61, 62, which also have recesses 63, 64 in their respective inner faces. Coiled springs 65, 66 which surround the hubs of free gears 54, 55 each have their inner ends bearing against the respective inner faces of the gear and their outer ends bearing against the respective inner faces of the clutches and exert an outward pressure on the clutches, which tends to keep them from engagement with the gears. Mounted on hubs 67, 68 of the clutches 61, 62, respectively, are circular wedge cams comprising rotatable and longitudinally movable members 69, 70 and fixed or non-rotatable members 71, 72. Rotatable cam member 69 has upstanding arm 73 which is pivotally related by link 74 to the upper extremity of the upwardly extending arm 75 keyed to rock shaft 76. Rotatable cam member 70 has a downwardly extending arm 77 which is pivotally related by link 78 to the lower extremity of the downwardly extending arm 79 also keyed to rock shaft 76. Non-rotatable cam members 71, 72 have arms 81, 80 respectively formed integral therewith and which have openings through their free ends for encircling rock shaft 76 for locking the non-rotatable cam members against rotation. Rock shaft 76 has keyed to its outer end arm 82 for rocking the shaft through the medium of link 83 which has one of its ends pivotally related to arm 82 and its other end pivotally related to the operating lever 84 pivoted as at 85 to a suitable support, not shown, carried by the swinging or rotatable bed or body. It will be noted by reference to Fig. 4 that the pitched contacting faces between cam members 69, 72 are parallel to the pitched contacting faces between the cam members 70 and 71 and that the rotatable member 69, see Fig. 5, is rotated by force applied above its axis of rotation, while rotatable member 70 is rotated by force applied below its axis of rotation, thus rotating the two rotatable members 69, 70 in opposite directions of rotation when rock shaft 76 is rocked by the operation of lever 84. By this arrangement of the clutch shifting cams the two broad portions of the members forming one of the cams will be moved into alignment, thus wedging one of the cone shaped clutches into contact with its free gear, while a broad and a narrow portion of the members forming the other cam will be moved automatically into alignment and give clearance for the other of the cone shaped clutches to be pushed outwardly or away from its respective free gear by the action of the spring interposed between it and the gear. Steering power transmission shaft 57 has secured to its lower extremity worm 86 in mesh with worm gear 87 affixed to shaft 88 journalled in bracket 89 affixed to the frame of the truck. Shaft 88 has affixed thereto a drum, not shown, to which may be reversely wound cables 94, 95 for operating the steering wheels in a well known manner. Steering power transmission shaft 57 is journalled in and supported by bearing 90, carried by bracket 89, at its lower extremity, and is journalled in and supported by bearing 91 carried by arms 92, 93 of bracket 53 at its upper extremity.

The operator of the machine herein described and illustrated is of necessity stationed on the swinging or rotating bed or body and has all the means for operating the several devices of the machine, including lever 48 of the steering device, described and illustrated in Figs. 1, 2 and 3, within easy and convenient reach. In the steering device, described and illustrated in Figs. 4, 5 and 6, the lever 84 is also placed within easy and convenient reach of the operator. We will assume that the machine is equipped with the steering device described and illustrated in Figs. 1, 2 and 3 and the machine is travelling in a straight line and it is desired to steer the machine to the right or left of its straight line course. It is obvious that this can be accomplished by moving bevelled gear 46 or 47 into contact with bevelled track 32, by the manipulation of lever 48, and causing steering power transmitting shaft 33 to rotate in a clockwise or contraclockwise direction according to the direction in which it is desired to cause the machine to travel. If the machine be equipped with the modified form of steering device described and illustrated in Figs. 4, 5 and 6, it will be equally obvious that the steering power transmitting shaft 57 may be caused to rotate in a clockwise or anti-clockwise direction for affecting the desired direction of travel by securing free gears 54 or 55 to shaft 52 by engagement therewith of its respective clutch by manipulation of operating lever 84. It will also be seen from the description and illustrations of the respective steering devices that all friction between the steering power transmitting shafts and the hollow power transmitting shaft 24 for transmitting power to the traction wheels is eliminated by the provision of supports for the steering power transmitting shaft independently of the power transmitting shaft for transmitting power to the traction wheels and in such manner as to maintain these two shafts in spaced relation to each other at all points.

I claim:

1. An automotive truck having a body mounted thereon, a steering shaft supported by the body, traction and steering wheels for supporting said automotive truck, a driven gear secured to the steering shaft, a power transmitting shaft lying at right angles to the steering shaft, two free reversing gears mounted on the power transmitting shaft and meshing with the driving gear, clutches splined to the power transmitting shaft for engaging the respective gears, clutch shifting mechanism for shifting the respective clutches supported by the power transmitting shaft and adapted to secure one of the reversing gears to the power transmitting shaft while simultaneously moving its respective clutch from the other of the reversing gears and a worm secured to said steering shaft and operatively connected with said steering wheels for adjusting said steering wheels.

2. An automotive truck having a body mounted thereon, traction wheels, and steering wheels for supporting said truck, a steering shaft supported by the body, a driven gear secured to the steering shaft, a power transmitting shaft lying at right angles to the steering shaft, two free reversing gears mounted on the power transmitting shaft and meshing with the driven gear, a hollow power shaft for transmitting power to the traction wheels, a travel gear secured to said hollow shaft and having means for driving said power transmitting shaft, clutches for engaging the respective gears splined to the power transmitting shaft, wedge cam mechanism for shifting the respective clutches supported by the power transmitting shaft and adapted to secure the reversing gears to the power transmitting shaft.

3. An automotive truck having a body mounted thereon, traction wheels and steering wheels for supporting said truck, a driven gear secured to the steering shaft, a power transmitting shaft lying at right angles to the steering shaft, two free reversing gears mounted on the power transmitting shaft and meshing with the driven gear, a hollow shaft for transmitting power to the traction wheels, a travel gear secured to said hollow shaft and having a rack adapted to engage a gear secured to said power transmitting shaft for driving the latter, clutches for engaging the respective gears splined to the power transmitting shaft, wedge clutch shifters having pitched end contacting portions and adapted to force the clutches into frictional engagement with the respective reversing gears when the clutch shifter is rotated about its axis.

4. An automotive truck having a body mounted thereon, traction wheels and steering wheels for supporting said truck, a steering shaft supported by the body, a driven gear secured to the steering shaft, a power transmitting shaft lying at right angles to the steering shaft, two free reversing gears mounted on the power transmitting shaft and meshing with the driven gear, a hollow power shaft for transmitting power to the traction wheels, a travel gear secured to said hollow shaft and having means for driving said power transmitting shaft, clutches for engaging the respective gears splined to the power transmitting shaft, wedge clutch shifters having pitched end contacting portions and adapted to force the clutches into frictional engagement with the respective reversing gears when the clutch shifter is rotated about its axis, and means for rotating the clutch shifters.

5. An automotive truck having a swing body pivotally related thereto by a hollow pivotal member, a traction power transmitting shaft extending through the pivotal member, a steering power transmission shaft extending through the traction power transmitting shaft and supported by and journalled at points spaced from and adjacent the upper and lower extremities of the traction power transmitting shaft, means for imparting rotation to the traction power transmitting shaft, and power actuated means for imparting rotation to the steering power transmitting shaft.

6. An automotive truck having a body rotatably mounted thereon, a hollow pivotal member connecting said body and said truck, a traction power transmitting shaft extending from said body to said truck and through said pivotal member, and a steering power transmission shaft extending through the traction power transmission shaft, brackets carried by the rotatable body and the truck respectively for rotatably supporting said steering power transmission shaft, the steering power transmission shaft being out of contact with the traction power transmitting shaft.

7. An automotive truck having a body mounted thereon, traction wheels and steering wheels for supporting the truck, a power shaft supported by the body and the truck for transmitting power to the traction wheels, a travel gear carried by the shaft, a power shaft for operating the steering wheels carried within the first named power shaft, and means carried by the travel gear adapted to engage means for rotating the steering power shaft when the travel gear is rotated.

8. An automotive truck having a body mounted thereon, traction wheels and steering wheels for supporting the truck, a power shaft for transmitting power to the traction wheels supported by the body and the truck, a travel gear affixed to the power shaft, an annular rack carried by the travel gear, a shaft carried at right angles to the first named shaft, a gear wheel affixed to the last named shaft and in mesh with the rack, a power shaft for operating the steering wheels carried within the first named power shaft, a gear wheel carried by the last named power shaft, free gears carried by the shaft lying at right angles to the first named power shaft, and meshing with the gear wheel carried by the power shaft for operating the steering wheels, and means for securing the free gears to the shaft lying at right angles to the first named power shaft.

In testimony whereof I have signed my name to this specification on this 17th day of March A. D. 1922.

EDMUND JOSEPH KANE.